US012657501B2

(12) United States Patent
Sterling et al.

(10) Patent No.: US 12,657,501 B2
(45) Date of Patent: Jun. 16, 2026

(54) PRECISION FERRITE-BASED ELECTROMAGNETIC SIGNAL CIRCULATORS FOR QUANTUM COMPUTING SYSTEMS

(71) Applicant: Google LLC, Mountain View, CA (US)

(72) Inventors: George Earl Grant Sterling, Santa Barbara, CA (US); Ofer Naaman, Santa Barbara, CA (US); Theodore Charles White, Goleta, CA (US)

(73) Assignee: GOOGLE LLC, Mountain View, CA (US)

( * ) Notice: Subject to any disclaimer, the term of this patent is extended or adjusted under 35 U.S.C. 154(b) by 188 days.

(21) Appl. No.: 18/332,455

(22) Filed: Jun. 9, 2023

(65) Prior Publication Data

US 2026/0073266 A1 Mar. 12, 2026

(51) Int. Cl.
| | |
|---|---|
| *G06N 10/40* | (2022.01) |
| *H01P 1/11* | (2006.01) |
| *H01P 1/393* | (2006.01) |

(52) U.S. Cl.
CPC ............... *G06N 10/40* (2022.01); *H01P 1/11* (2013.01); *H01P 1/393* (2013.01)

(58) Field of Classification Search
CPC .... H01P 1/11; H01P 1/393; H01P 1/38; H01P 1/383; H01P 1/387; H01P 1/32; H01P 1/36; G06N 10/40
USPC .......................................................... 333/1.1
See application file for complete search history.

(56) References Cited

U.S. PATENT DOCUMENTS

| | | | |
|---|---|---|---|
| 4,789,844 | A | 12/1988 | Schloemann |
| 11,417,822 | B2 | 8/2022 | Bronn et al. |

FOREIGN PATENT DOCUMENTS

| | | |
|---|---|---|
| JP | H 07326908 | 12/1995 |
| JP | H 10276013 | 10/1998 |
| JP | 2007006100 | 1/2007 |

OTHER PUBLICATIONS

JPH07326908 Annotated English Translation (Year: 1995).*
Helszajn, "The Stripline Circulator.", John Wiley and Sons, Inc., May 16, 2008, 28 pages.
Linkhart, "Microwave Circulator Design", Artech House, 2014, 8 pages.
International Search Report and Written Opinion for Application No. PCT/US2024/033066, mailed Oct. 4, 2024, 50 pages.

(Continued)

*Primary Examiner* — Andrea Lindgren Baltzell
*Assistant Examiner* — Abigail Amir Yaldo
(74) *Attorney, Agent, or Firm* — DORITY & MANNING, P.A.

(57) ABSTRACT

The disclosure is directed to a waveguide assembly within a non-reciprocal electronic device (e.g., a circulator). The waveguide assembly may include a ferrite member, a magnetic member, and a pole assembly. The pole assembly, in combination with at least the ferrite member and the magnetic member forms a magnetic circuit. The pole assembly has a spatial variance of a magnetic reluctance. The spatial variance of the magnetic reluctance of the pole assembly provides an increase in a uniformity of a magnetic flux throughout a volume of the ferrite member. A non-reciprocal property of the electronic device is enhanced due to the increase in the uniformity of the magnetic flux throughout the volume of the ferrite member.

19 Claims, 15 Drawing Sheets

(56) References Cited

OTHER PUBLICATIONS

Miura, "An Experimental High Isolation Ferrite Substrate Circulator Magnetized by Trigonally Symmetric Pole Pieces", Intermag Conference, IEEE Transactions on Magnetics, Sep. 1972, pp. 509-510.
International Preliminary Report on Patentability for Application No. PCT/US2024/033066, mailed Dec. 18, 2025, 16 pages.

* cited by examiner

Member
342

Spiral
Gradient
344

Double Convex
Pole Member
412

Planoconvex
Pole Member
422

Convex Meniscus
Pole Member
432

Double Concave
Pole Member
442

Planoconcave
Pole Member
452

Concave Meniscus
Pole Member
462

Pole
Member
602

First
Pole
Assembly
610

Second
Pole
Assembly
620

PRECISION FERRITE-BASED ELECTROMAGNETIC SIGNAL CIRCULATORS FOR QUANTUM COMPUTING SYSTEMS

FIELD

The present disclosure relates generally to quantum computing systems, and more particularly to precision ferrite-based microwave and radio-frequency signal circulators employable in quantum computing systems.

BACKGROUND

Quantum computing is a computing method that takes advantage of quantum effects, such as superposition of basis states and entanglement to perform certain computations more efficiently than a classical digital computer. In contrast to a digital computer, which stores and manipulates information in the form of bits, e.g., a "1" or "0," quantum computing systems can manipulate information using quantum bits ("qubits"). A qubit can refer to a quantum device that enables the superposition of multiple states, e.g., data in both the "0" and "1" state, and/or to the superposition of data, itself, in the multiple states. In accordance with conventional terminology, the superposition of a "0" and "1" state in a quantum system may be represented, e.g., as a $|0\rangle$ +b $|1\rangle$ The "0" and "1" states of a digital computer are analogous to the $|0\rangle$ and $|1\rangle$ basis states, respectively of a qubit.

SUMMARY

Aspects and advantages of embodiments of the present disclosure will be set forth in part in the following description, or can be learned from the description, or can be learned through practice of the embodiments.

One example aspect of the present disclosure is directed to a waveguide assembly within a non-reciprocal electronic device (e.g., a circulator). The waveguide assembly may include a ferrite member, a magnetic member, and a pole assembly. The pole assembly, in combination with at least the ferrite member and the magnetic member forms a magnetic circuit. The pole assembly has a spatial variance of a magnetic reluctance. The spatial variance of the magnetic reluctance of the pole assembly provides an increase in a uniformity of a magnetic flux throughout a volume of the ferrite member. A non-reciprocal property of the electronic device is enhanced due to the increase in the uniformity of the magnetic flux throughout the volume of the ferrite member.

Other aspects of the present disclosure are directed to various systems, methods, apparatuses, non-transitory computer-readable media, computer-readable instructions, and computing devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
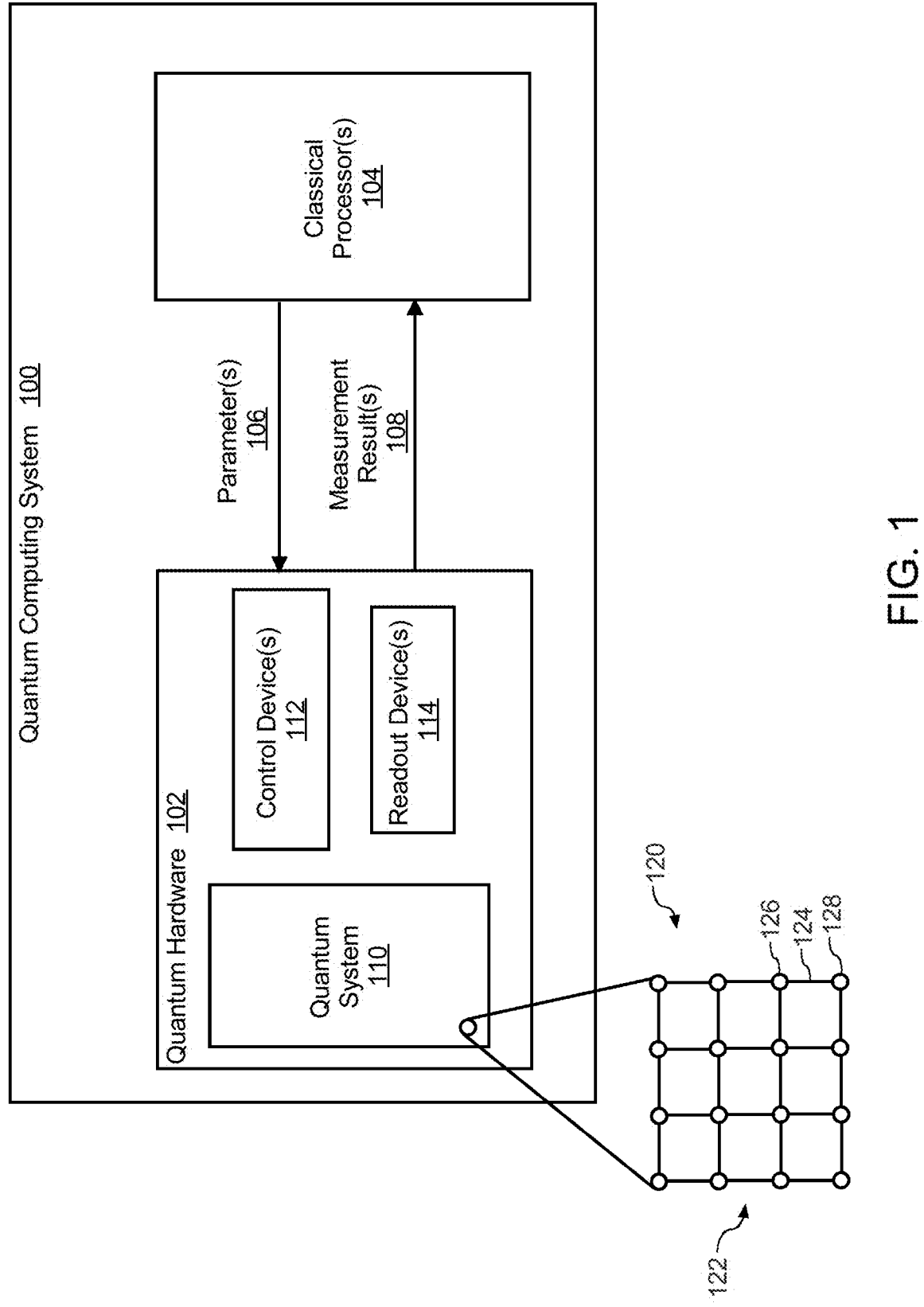
FIG. 1 depicts an example quantum computing system according to example embodiments of the present disclosure.

Example aspects of the present disclosure are directed to precision ferrite-based circulators for microwave signals and or radio-frequency electromagnet (EM) signals. The precision circulators of the embodiments may be employed in quantum computing systems. More specifically, the circulators may be employed to route and/or isolate microwave ($\mu$wave) and/or radiofrequency (RF) signals generated in quantum computing systems, (e.g., qubit control and/or qubit readout signals). Precision circulators of the embodiments may be operable within a cryogenic system (e.g., a cryogenic system within a quantum computer) or within other $\mu$wave or RF systems that require circulators for signal routing and/or signal isolation. One general property of circulators of the embodiments includes non-reciprocal signal routing and signal isolation. Such non-reciprocal devices provide an asymmetry in the direction of flow of an EM signal. The asymmetry in the directional flow of signals provides precision routing and isolation of the signals.

At least some of the embodiments are directed towards ferrite-based circulators. As discussed below, ferrite-based circulators achieve the non-reciprocal routing and/or isolation of an input signal via EM interactions between the input signal (e.g., a $\mu$wave or RF wave) and an approximately temporally constant and uniform magnetic field within the circulator. As discussed below, deviations from uniformity of the magnetic field can degrade the performance of a circulator. As used herein, a uniform magnetic field describes an (at least approximate) spatial uniformity of a magnetic flux density of the magnetic field throughout a ferrite member of the circulator.

Thus, the embodiments are directed to precisely controlling the shape and/or uniformity of the magnetic field within the circulator. Traditional methods of controlling the uniformity and shape of magnetic fields within circulators may fail when scaled to the requirements of some $\mu$wave or RF wave systems (e.g., cryogenic systems and/or quantum computing systems). In the embodiments, a waveguide assembly included in a circulator comprises a magnetic circuit that has one or more magnetic members, one or more pole assemblies, and one or more ferrite members. Via the one or more magnetic members, a magnetic field is generated throughout the magnetic circuit, including within the one or more ferrite members. The magnetic field within the ferrite members serves to polarize (or bias) the ferrite members. The embodiments include precisely controlling the shape and/or uniformity of the magnetic field within the magnetic circuit, including the one or more ferrite members, by varying the magnetic reluctance, as a function of position, within the one or more pole assemblies. That is, a uniformity of the magnetic flux density throughout the ferrite members is increased in the embodiments via the design and placement of the pole assemblies. More specifically, the increase in the uniformity of the magnetic flux density (within the ferrite members) is achieved by spatially varying a magnetic reluctance in the pole assemblies. The spatial variance of the magnetic reluctance within a pole assembly is primarily achieved by spatially varying the magnetic reluctance of one or more pole members included in the pole assembly.

A pole assembly may include one or more pole members. A pole member may be a 3D object such as but not limited to a cylindrical disk (e.g., a circular or ellipsoidal cylinder). Although the embodiments are not so limited, and a pole member may assume other 3D forms, such as but not limited to a sphere, an ellipsoid, parallelepiped, or other such forms. A pole member may be of an irregular shape. An aspect ratio of a cylindrical (circular or ellipsoidal) disk may be defined as the ratio of the vertical height (or thickness) of the cylinder disk to its diameter (or major or minor axis of an ellipsoidal disk). In various embodiments, a cylindrical disk may have an aspect ratio of less than 1.0. In some embodiments, the aspect ratio of a cylindrical disk may be significantly less than 1.0.

The variance of the magnetic reluctance of the pole assembly may be achieved by spatially varying at least one of a shape or a magnetic permeability of the pole member as a function of position on a surface of the pole member. For instance, the shape (e.g., a measured from a side-profile) of a cylindrical disk pole member may be varied by varying the thickness (e.g., height) of the pole member as a function of the position on a top (or bottom) surface of the pole member. The thickness of a pole member may be measured in the vertical direction. Note that the vertical direction in the various embodiments may be defined to be substantially parallel with the primary direction of the magnetic field (generated by the magnetic members) penetrating the volume of the pole member. That is, the vertical direction, which defines the thickness of a pole member, is primarily aligned with the magnetic dipoles of the magnetic members, when both the magnetic members and the pole members are positioned within the magnetic circuit of the waveguide. The thickness (or shape) of a pole member may be varied by various discrete objects included on the top and/or bottom of the pole member, such as but not limited to voids (e.g., perforations), etchings, recesses, protrusions on the one or more surfaces of a pole member. For instance, in the location of a void (e.g., a hole), the thickness of the pole member may be 0.0, whereas where voids are not located, the thickness of the pole member may be non-zero. The etchings may be fabricated via an electrochemical etching process. The various discrete objects may have a uniform or non-uniform geometrical shape. The patterning of the discrete objects may be a regular and/or symmetrical patterning about one or more axes of rotation and/or reflection. In other embodiments, the patterning of the discrete objects may be irregular and/or asymmetrical patterning. In some embodiments, the thickness may be varied at least somewhat continuously via a continuous gradient of the pole members' thickness.

A magnetic susceptibility of a pole member may be varied by similar discrete and/or continuous ways. For example, a pole member may be comprised of a plurality of materials, each with a separate magnetic susceptibility. By varying the various placements of the separate materials, the magnetic susceptibility of the pole member may be varied as a function of position within the pole member. Pole members comprised of more than one material may be referred to as composite pole members. Similar to the spatial variances in the shape of the pole member, the spatial variances of the magnetic permeability of the pole member may be symmetrical or asymmetrical. Spatial variances of both the shape (e.g., thickness) and the magnetic permeability may be combined within a single pole member.

Spatially varying the shape and/or magnetic permeability of a pole member may be described as a gradient in the pole member. The gradient may be a thickness gradient, in that that thickness of the pole member spatially varies. The gradient may be a magnetic permeability gradient, in that that thickness of the pole member spatially varies. Note that both thickness and magnetic permeability gradient can be continuous gradient or discontinuous gradient. Examples of discontinuous gradients can be the inclusion of various discrete objects, such as but not limited to voids, recesses, protrusions, and the like on the one or more surfaces of a pole member.

By spatially varying the magnetic reluctance of the pole members, non-uniformities associated with the one or more magnets (of the magnetic circuit) may be compensated for. That is, deviations from non-uniformity of the magnetic field may be compensated for by spatial variances in the magnetic permeability and/or shape (e.g., thicknesses) of the pole members. In the presence of pole members with spatial variances in their magnetic permeability and/or thicknesses, the non-uniform magnetic field provided by the one or more magnets is shaped to be sufficiently uniform throughout the ferrite members for the precise routing and/or isolation of signals.

The circulators of the embodiments include a waveguide assembly that acts as a waveguide with non-reciprocal behavior. The waveguide assembly includes at least one magnet (e.g., a magnetic member), at least one pole assembly (e.g., including at least a pole member), and at least one ferrite member. The magnets, pole assemblies, and ferrite members form a magnetic circuit within the waveguide assembly. The application of the magnetic field of the magnet polarizes (or biases) the ferrite members. When an input EM signal interacts with the polarized ferrite member, the signal is subject to Faraday rotations. A Faraday rotation essentially rotates the plane of polarization of the EM signal (e.g., a rotation of 45°). Via a waveguide (e.g., a resonator, transmission line, or the like) and the rotation of the polarization plane, the circulator provides the non-reciprocal transmission of the EM signal. Deviations from a uniform magnetic field degrade the ferrite material's ability to provide precise Faraday rotations of the polarization plane of the EM signal. Thus, a non-uniform magnetic field degrades the non-reciprocal signal routing and signal isolation capabilities of the circulator.

The pole members (or pole pieces) are included in the one or more pole assemblies. The one or more pole assemblies are disposed near one or more magnets (e.g., a permanent magnet) within the waveguide assembly. The pole members are composed of high magnetic permeability materials that serve to shape the magnetic field generated by the magnets.

To precisely control the flux density of the magnetic field within the ferrite members and throughout the magnetic circuit, and to ensure the desired shape and/or uniformity of the field, the shape and/or magnetic permeability of the pole assemblies may be spatially varied. By spatially varying the shape and/or magnetic permeability of the pole members, when the pole assemblies are positioned within the magnetic circuit, the magnetic reluctance within the pole members (and thus the pole assemblies) is spatially varied. By spatially varying the magnetic reluctance of one or more member pieces with the pole assemblies (as a function of position), the resulting shape and/or uniformity of the flux density of the field may be precisely controlled within the magnetic circuit, including within the ferrite members.

In general, circulators are passive electronic devices with three (or mor) signal ports (or signal terminals). Circulators are designed to deterministically route an input electromagnetic signal (e.g., a μwave or RF) from one of the ports to another port. Circulators typically work on the principle of non-reciprocity, meaning that the signal flow is asymmetric between ports. For instance, in a three-port (or terminal) circulator, the ports may be labeled as Port 1, Port 2, and Port 3. When a signal is applied to Port 1, the circulator allows the signal to pass through to Port 2 while providing high isolation between Port 2 and Port 3. This means that signals can flow from Port 1 to Port 2, but they are effectively blocked from reaching Port 3. If a signal is applied to Port 2, the circulator routes the signal to Port 3 while maintaining high isolation between Port 1 and Port 3. Thus, signals can travel from Port 2 to Port 3, but they are isolated and prevented from reaching Port 1. A critical characteristic of a circulator is its ability to provide isolation between ports. This means that signals entering one port are mostly prevented from leaking or interfering with signals at other ports. The degree of isolation determines the effectiveness of signal separation. The circulators of the embodiments are employable in quantum computing systems. However, the embodiments are not so limited, and the circulators disclosed herein may be employed in various applications, including, but limited to radar systems, telecommunication networks, satellite communications, and other RF and/or μwave systems. The various circulators disclosed herein help control the flow of signals, prevent signal reflections, and improve overall system performance by reducing interference and isolating different components within the system. Although the discussion throughout is focused on 3-port circulators, the embodiments are not so limited, and may be readily extended to circulators with any number of ports greater than three.

The embodiments are directed to ferrite circulators. Ferrite circulators require a uniform magnetic field to provide precision signal routing and signal isolation. The presence of a uniform magnetic field is essential for the functioning of the ferrite material within the circulator. The ferrite members are comprised of ferrite materials, such as but not limited to iron oxide compounds. Ferrite materials may exhibit a property known as "gyromagnetic resonance" or "Ferrimagnetic resonance." That is, ferrite materials may absorb and emit microwave energy under the influence of a magnetic field. To enable the above discussed non-reciprocal behavior of a circulator, a bias magnetic field is applied to the ferrite material within the circulator. The bias magnetic field may be provided by the magnetic members. This magnetic field aligns the magnetic moments within the ferrite members, allowing for the desired gyromagnetic resonance behavior. The uniformity of this magnetic field is crucial for consistent and predictable non-reciprocal behavior of the circulator.

When an EM signal enters the waveguide assembly of the circulator, the signal interacts with the ferrite material (via the EM force). The uniform magnetic field enables the ferrite material to absorb a portion of the signal's energy and re-emit it in a specific direction (e.g., via a Faraday rotation of the signal's plane of polarization). The non-reciprocal behavior ensures that the signal is routed to the appropriate output port while minimizing reflection and interference among multiple signals provided to and/or by the various ports. The pole members of the embodiments control the distribution (e.g., the shape and uniformity) of the magnetic field. That is, by spatially varying the shape and magnetic permeability of the pole members, the pole members shape and concentrate the magnetic field within the ferrite members.

Aspects of the present disclosure provide a number of technical effects and benefits. For instance, the pole members (with various gradients) help in directing and focusing the magnetic field within the ferrite members. This may provide that the magnetic field is concentrated in the desired region, optimizing the circulator's performance. The pole members of the embodiments provide improved signal isolation. By spatially varying the shape and/or magnetic permeability of the pole members, the pole members can enhance the isolation between the input and output ports of the circulator. By directing the magnetic field in specific ways, pole members suppress undesired signal reflections and improve the isolation performance of a circulator. The pole members of the embodiments aid in reducing magnetic field leakage, which can lead to losses in the circulator. By shaping and guiding the magnetic field, the pole members help reduce or minimize the leakage of the magnetic field outside the ferrite material, resulting in lower insertion loss and improved overall efficiency. By spatially varying the shape and/or magnetic permeability of the pole members, the operating bandwidth of the circulator may be increased (or decreased if desired within a particular application of a circulator). Thus, the pole members of the embodiments improve performance characteristics of a circulator (and other non-reciprocal devices), such as but not limited to isolation, insertion loss, efficiency, and bandwidth.

FIG. 1 depicts an example quantum computing system 100. The system 100 is an example of a system of one or more classical computers and/or quantum computing devices in one or more locations, in which the systems, components, and techniques described below can be implemented. Those of ordinary skill in the art, using the disclosures provided herein, will understand that other quantum computing devices or systems can be used without deviating from the scope of the present disclosure.

The system 100 includes quantum hardware 102 in data communication with one or more classical processors 104. The classical processors 104 can be configured to execute computer-readable instructions stored in one or more memory devices to perform operations, such as any of the operations described herein. The quantum hardware 102 includes components for performing quantum computation. For example, the quantum hardware 102 includes a quantum system 110, control device(s) 112, and readout device(s) 114 (e.g., readout resonator(s)). The quantum system 110 can include one or more multi-level quantum subsystems, such as a register of qubits (e.g., qubits 120). In some implementations, the multi-level quantum subsystems can include superconducting qubits, such as flux qubits, charge qubits, transmon qubits, gmon qubits, spin-based qubits, and the like.

The type of multi-level quantum subsystems that the system 100 utilizes may vary. For example, in some cases it may be convenient to include one or more readout device(s) 114 attached to one or more superconducting qubits, e.g., transmon, flux, gmon, xmon, or other qubits. In other cases, ion traps, photonic devices or superconducting cavities (e.g., with which states may be prepared without requiring qubits) may be used. Further examples of realizations of multi-level quantum subsystems include fluxmon qubits, silicon quantum dots or phosphorus impurity qubits.

Quantum circuits may be constructed and applied to the register of qubits included in the quantum system 110 via multiple control lines that are coupled to one or more control devices 112. Example control devices 112 that operate on the register of qubits can be used to implement quantum gates or quantum circuits having a plurality of quantum gates, e.g., Pauli gates, Hadamard gates, controlled-NOT (CNOT) gates, controlled-phase gates, T gates, multi-qubit quantum gates, coupler quantum gates, etc. The one or more control devices 112 may be configured to operate on the quantum system 110 through one or more respective control parameters (e.g., one or more physical control parameters). For example, in some implementations, the multi-level quantum subsystems may be superconducting qubits and the control devices 112 may be configured to provide control pulses to control lines to generate magnetic fields to adjust the frequency of the qubits.

The quantum hardware 102 may further include readout devices 114 (e.g., readout resonators). Measurement results 108 obtained via measurement devices may be provided to the classical processors 104 for processing and analyzing. In some implementations, the quantum hardware 102 may include a quantum circuit and the control device(s) 112 and readout devices(s) 114 may implement one or more quantum logic gates that operate on the quantum system 102 through physical control parameters (e.g., microwave pulses) that are sent through wires included in the quantum hardware 102. Further examples of control devices include arbitrary waveform generators, wherein a DAC (digital to analog converter) creates the signal.

The readout device(s) 114 may be configured to perform quantum measurements on the quantum system 110 and send measurement results 108 to the classical processors 104. In addition, the quantum hardware 102 may be configured to receive data specifying physical control qubit parameter values 106 from the classical processors 104. The quantum hardware 102 may use the received physical control qubit parameter values 106 to update the action of the control device(s) 112 and readout devices(s) 114 on the quantum system 110. For example, the quantum hardware 102 may receive data specifying new values representing voltage strengths of one or more DACs included in the control devices 112 and may update the action of the DACs on the quantum system 110 accordingly. The classical processors 104 may be configured to initialize the quantum system 110 in an initial quantum state, e.g., by sending data to the quantum hardware 102 specifying an initial set of parameters 106.

In some implementations, the readout device(s) 114 can take advantage of a difference in the impedance for the $|0\rangle$ and $|1\rangle$ states of an element of the quantum system, such as a qubit, to measure the state of the element (e.g., the qubit). For example, the resonance frequency of a readout resonator can take on different values when a qubit is in the state $|0\rangle$ or the state $|1\rangle$, due to the nonlinearity of the qubit. Therefore, a microwave pulse reflected from the readout device 114 carries an amplitude and phase shift that depend on the qubit state. In some implementations, a Purcell filter can be used in conjunction with the readout device(s) 114 to impede microwave propagation at the qubit frequency.

In some embodiments, the quantum system 110 can include a plurality of qubits 120 arranged, for instance, in a two-dimensional grid 122. For clarity, the two-dimensional grid 122 depicted in FIG. 1 includes 4×4 qubits, however in some implementations the system 110 may include a smaller or a larger number of qubits. In some embodiments, the multiple qubits 120 can interact with each other through multiple qubit couplers, e.g., qubit coupler 124. The qubit couplers can define nearest neighbor interactions between the multiple qubits 120. In some implementations, the strengths of the multiple qubit couplers are tunable parameters. In some cases, the multiple qubit couplers included in the quantum computing system 100 may be couplers with a fixed coupling strength.

In some implementations, the multiple qubits 120 may include data qubits, such as qubit 126 and measurement qubits, such as qubit 128. A data qubit is a qubit that participates in a computation being performed by the system 100. A measurement qubit is a qubit that may be used to determine an outcome of a computation performed by the data qubit. That is, during a computation an unknown state of the data qubit is transferred to the measurement qubit using a suitable physical operation and measured via a suitable measurement operation performed on the measurement qubit.

In some implementations, each qubit in the multiple qubits 120 can be operated using respective operating frequencies, such as an idling frequency and/or an interaction frequency and/or readout frequency and/or reset frequency. The operating frequencies can vary from qubit to qubit. For instance, each qubit may idle at a different operating frequency. The operating frequencies for the qubits 120 can be chosen before a computation is performed.

FIG. 1 depicts one example quantum computing system that can be used to implement the methods and operations according to example aspects of the present disclosure. Other quantum computing systems can be used without deviating from the scope of the present disclosure.

Figure 2A:
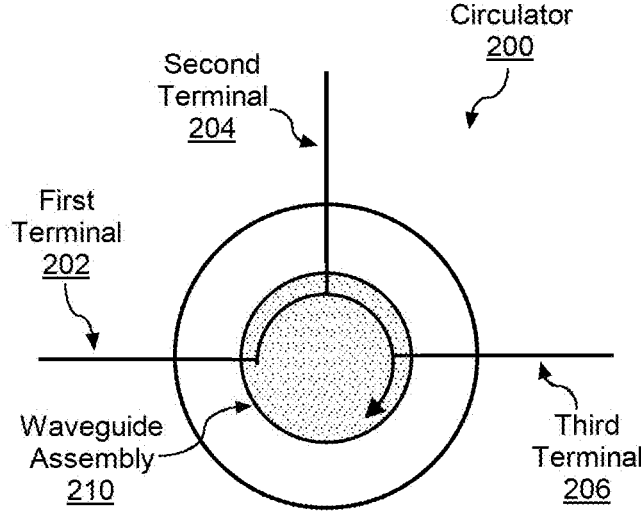
FIG. 2A depicts a schematic view of an example circulator that includes a waveguide assembly, according to example embodiments of the present disclosure.

FIG. 2A depicts a schematic view of an example circulator 200 according to various embodiments. The view of circulator 200 in FIG. 2A is a top-down view. The circulator includes a first terminal 202 (or a first port), a second terminal 204 (or a second port), and a third terminal 206 (or a third port), as well as a waveguide assembly 210. Details of the waveguide assembly 210 are discussed in conjunction with FIG. 2B. However, briefly here, the waveguide assembly 210 is constructed to provide a non-reciprocal behavior of the circulator 200.

The clockwise arrow in FIG. 2A is provided to illustrate the non-reciprocal behavior of the circulator 200. The non-reciprocal behavior of the circulator 200 includes: in response to a first signal being provided as an input signal to the first terminal 202, the second terminal 204 provides the first signal as an output signal. The non-reciprocal behavior of the circulator 200 additionally includes: in response to the first signal being provided as the input signal to the second terminal 204, the third terminal 206 provides the first signal as the output signal. Furthermore, the non-reciprocal behavior of the circulator 200 includes: in response to the first signal being provided as the input signal to the third terminal 206, the first terminal 202 provides the first signal as the output signal.

Figure 2B:
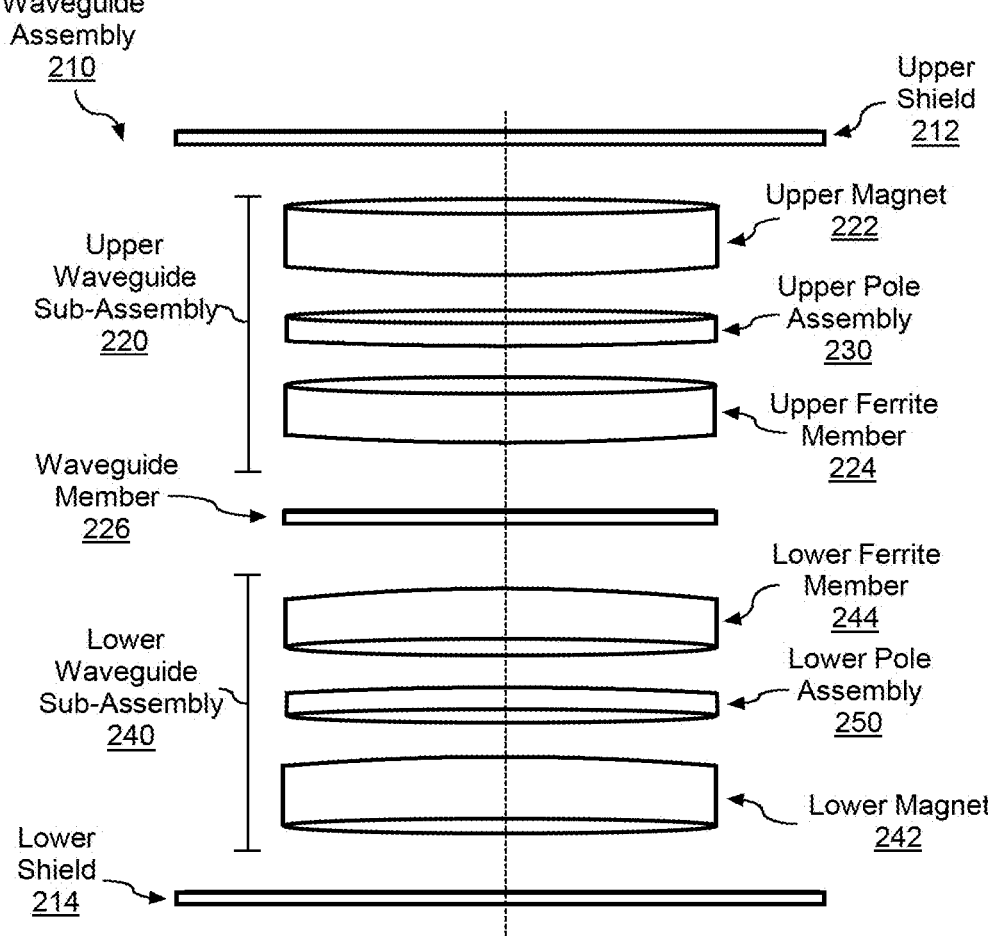
FIG. 2B depicts an exploded view of the waveguide assembly of FIG. 2A, according to example embodiments of the present disclosure.

FIG. 2B depicts an exploded view of the waveguide assembly 210 of FIG. 2A, according to various embodiments. The exploded view of the waveguide assembly 210 in FIG. 2B is a side-view (e.g., rotated 90° from the top-down view of FIG. 2A). Waveguide assembly 210 includes an upper waveguide sub-assembly 220, a lower waveguide sub-assembly 240, and a waveguide member 226 (e.g., a stripline) disposed between the upper waveguide sub-assembly 220 and the lower waveguide sub-assembly 240. An upper shield 212 is disposed above the upper waveguide sub-assembly 220. A lower shield 214 is disposed below the lower waveguide sub-assembly 240. The upper shield 212 and the lower shield 214 may be magnetic shields.

The upper waveguide sub-assembly 220 includes an upper magnet 222 (e.g., an upper magnetic member), an upper ferrite member 224, and an upper pole assembly 230 disposed vertically between the upper magnet 222 and the upper ferrite member 224. Similarly, the lower waveguide sub-assembly 240 may include a lower magnet 242 (e.g., a lower magnetic member), a lower ferrite member 244, and a lower pole assembly 250 disposed vertically between the lower magnet 242 and the lower ferrite member 244. Thus, the waveguide assembly 210 may exhibit a vertical symmetry upon reflection of the plane of the waveguide member 226. In some embodiments, the upper magnet 222 and the lower magnet 242 may be permanent magnets. In other embodiments, the upper magnet 222 and the lower magnet 242 may be electromagnets.

Various embodiments of the upper pole assembly 230 and the lower pole assembly 250 are comprised of one or more pole members. In the non-limiting embodiment shown in FIG. 2B, each of the upper magnet 222, the upper pole assembly 230, the upper ferrite member 224, the lower ferrite member 244, the lower pole assembly 250, and the lower magnet 242 can be described as cylindrical disks. Thus, in additional to the symmetry about a horizontal plane, the waveguide assembly may include an overall rotational symmetry about the vertical dashed line. However, as discussed below, because the shape (e.g., thickness) and/or magnetic permeability of the pole members, the pole members may not include a rotational symmetry.

FIGS. 3A-6B shows various embodiments of pole assemblies and pole members. However, briefly here, a pole member may be a cylindrical disk (or other such shapes) comprised of one or more high magnetic permeability materials. In some embodiments, a shape of the one or more pole members may be spatially varied (e.g., one or more perturbations from a cylindrical disk). For example, a thickness of the pole member may be varied as a function of position on the upper (or lower) surface of the cylindrical disk. Additionally, and/or alternatively, the magnetic susceptibility of a pole member may be varied as a function of the position of the upper (or lower) surface of the cylindrical disk. Spatial variances in pole members may be accomplished by fabricating the pole members from multiple materials with difference magnetic permeabilities, e.g., a composite pole member.

The spatial variance of the shape (e.g., thickness) of a pole member may be a shape/thickness gradient, while the spatial variance of the magnetic permeability of the pole member may be a magnetic permeability gradient. Gradients can be continuous gradients or non-continuous gradients. Some gradients may include regular patterns and/or have one or more directions of symmetry (e.g., symmetrical gradients). Other gradients may be irregular and/or non-symmetric. None of spatial variances (or gradients) of the shape/thickness and/or magnetic permeabilities demonstrated in FIGS. 3A-6B is intended to be limiting. One or more pole members may be fabricated to have essentially any spatial variance (or gradient) of the thickness and/or magnetic permeabilty required to increase the uniformity of a particular magnetic field.

Figure 3A:
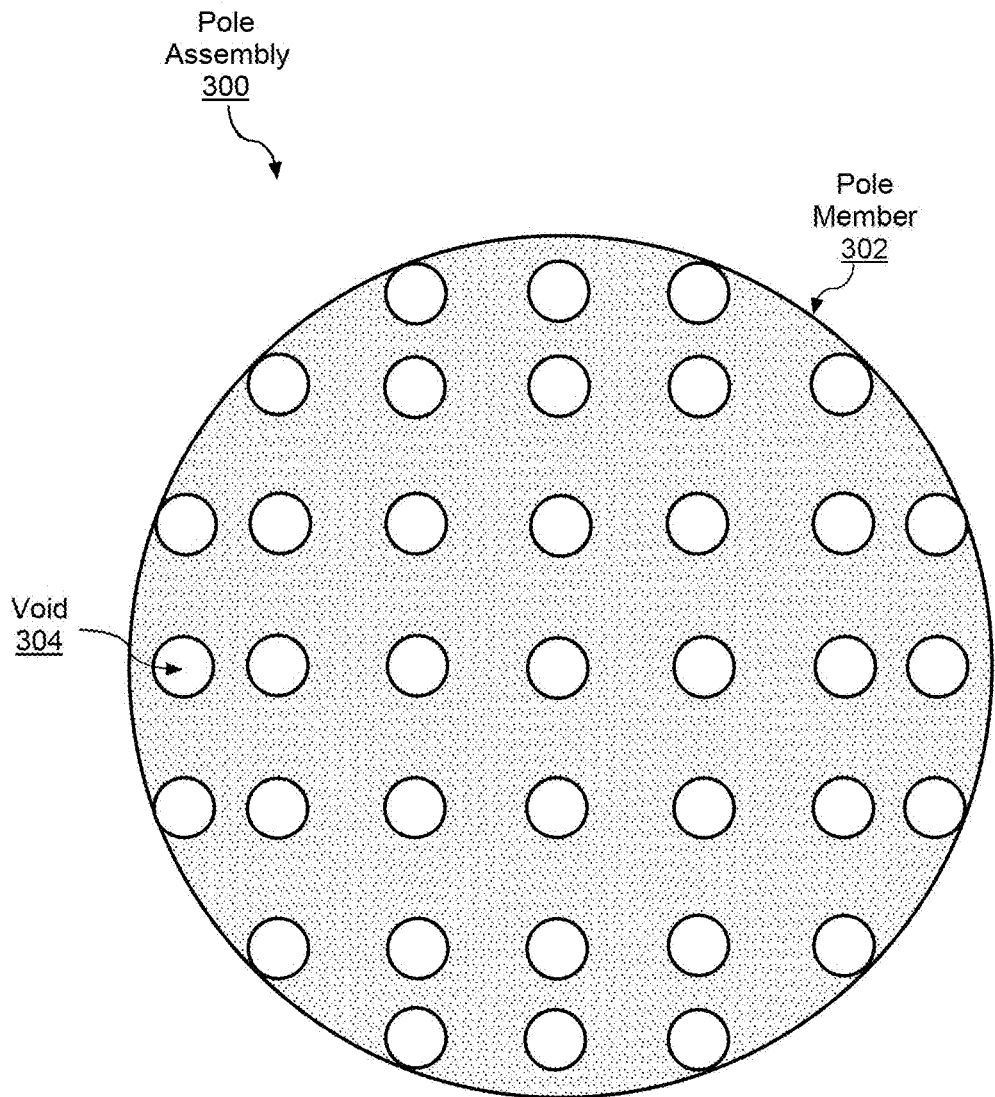
FIGS. 3A-3F depict example embodiments of pole assemblies and pole members with example, but non-limiting, discontinuous and continuous spatial variances in their thicknesses and magnetic permeabilities.

FIGS. 3A-3F show top-down views of various pole members according to the embodiments. FIG. 3A shows a pole assembly 300 with a pole member 302 according to various embodiments. Pole assembly 300 may be similar to upper pole assembly 230 and/or lower pole assembly 250 of FIG. 2A. In non-limiting embodiments, pole member 302 may be shaped as a cylindrical (circular or elliptical) cylinder with a relatively low aspect ratio (e.g., the aspect ratio of pole member 302 may be significantly less than 1.0). Pole member 302 may be comprised of a material that is of relatively high magnetic permeability. The view of FIG. 3A may be a top-down (or bottom-up) view of the pole member 302. Pole member 302 includes a plurality of voids (or holes), such as void 304, through the volume of the pole member 302. The voids (or holes) may include perforations through the volume of the pole member 302. The voids may be bore holes in the upper (or lower) surface of the pole member 302. The patterning of the plurality of voids shown in FIG. 3A is for example purposes only. The shape, size, positioning and number of voids may be varied from that shown in FIG. 3A, depending on the specifics of the non-uniform magnetic field that is to be shaped and/or focused. Note, FIG. 3A is non-limiting, and the size of the voids need not be uniform. Additionally, the patterning of the voids (e.g., holes or perforations) may be symmetrical, but need not be. Note that the shape of pole member 302 is spatially varied in that some portions have a positive (finite) thickness, while other portions (e.g., void 304) have a thickness of 0.0. Although the spatial variance of the thickness is depicted as discontinuous in FIG. 3A, in other embodiments, the spatial variance may be at least somewhat continuous. For example, the sidewalls of the voids may be sloped inward or outward, to provide a gradient in thickness which forms the voids.

Figure 3B:
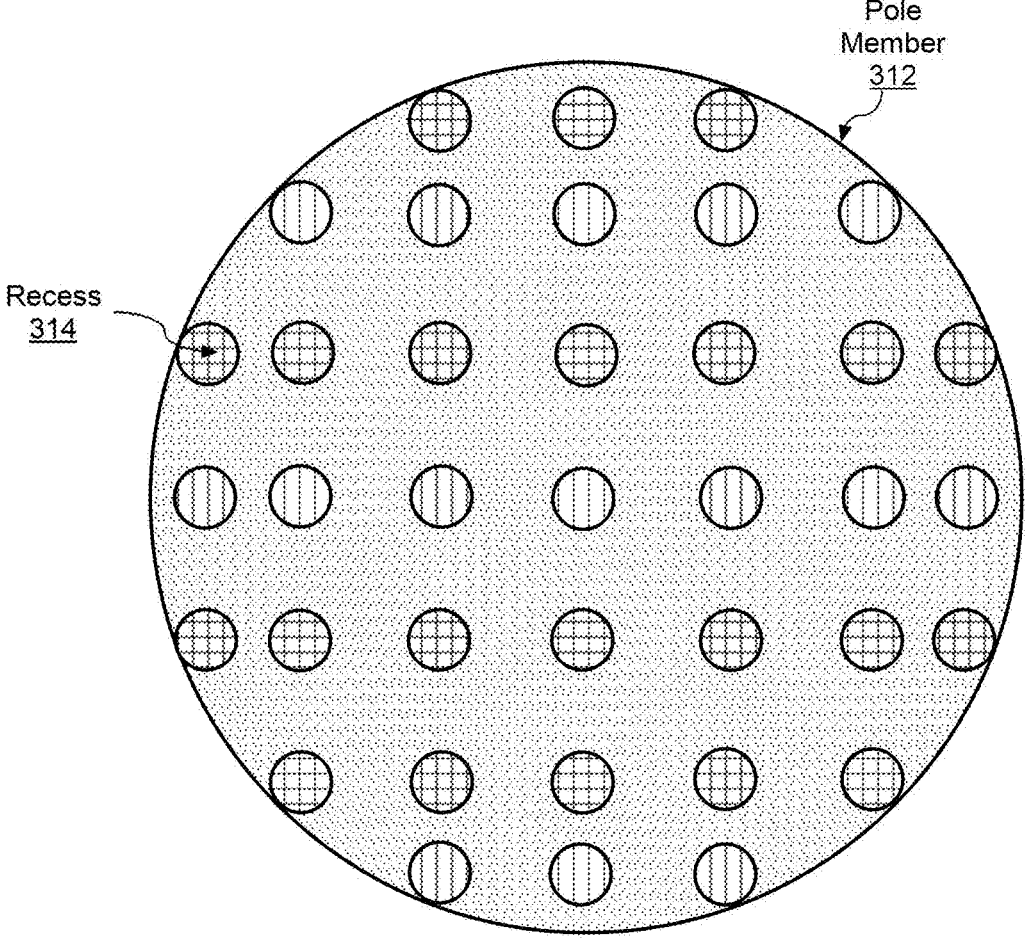

FIG. 3B shows another pole member 312 according to various embodiments. Pole member 312 may be included in the upper pole assembly 230 and/or lower pole assembly 250 of FIG. 2A. Pole member 312 may be similar to pole member 302 of FIG. 3A. However, rather than having a plurality of voids (e.g., bore holes or perforations), pole member 312 has a plurality of recesses (e.g., recess 314). A recess may be similar to a void, except that the recess has a depth that is less than the finite vertical thickness of the pole member 312 A recess may be an etching on one or more surfaces of the pole member 312. The etchings may be fabricated via an electrochemical etching process. Similar to the discussion of FIG. 3A, FIG. 3B is non-limiting and the shape, size, positioning, configurations, and the like of the recesses may be varied from that depicted in FIG. 3B. For instance, the sidewalls of the recesses may be sloped to provide a gradient in the thickness of pole member 312. The different style of hatching shown for the recesses illustrates that the depth of the recesses may be varied. Also, at least in some embodiments, one or more of the recesses may be "plugged" with an insert (or plug) of a material with a different magnetic permeability that that of the material that makes up the cylindrical disk (or other 3D shape) of the pole member 312.

Figure 3C:
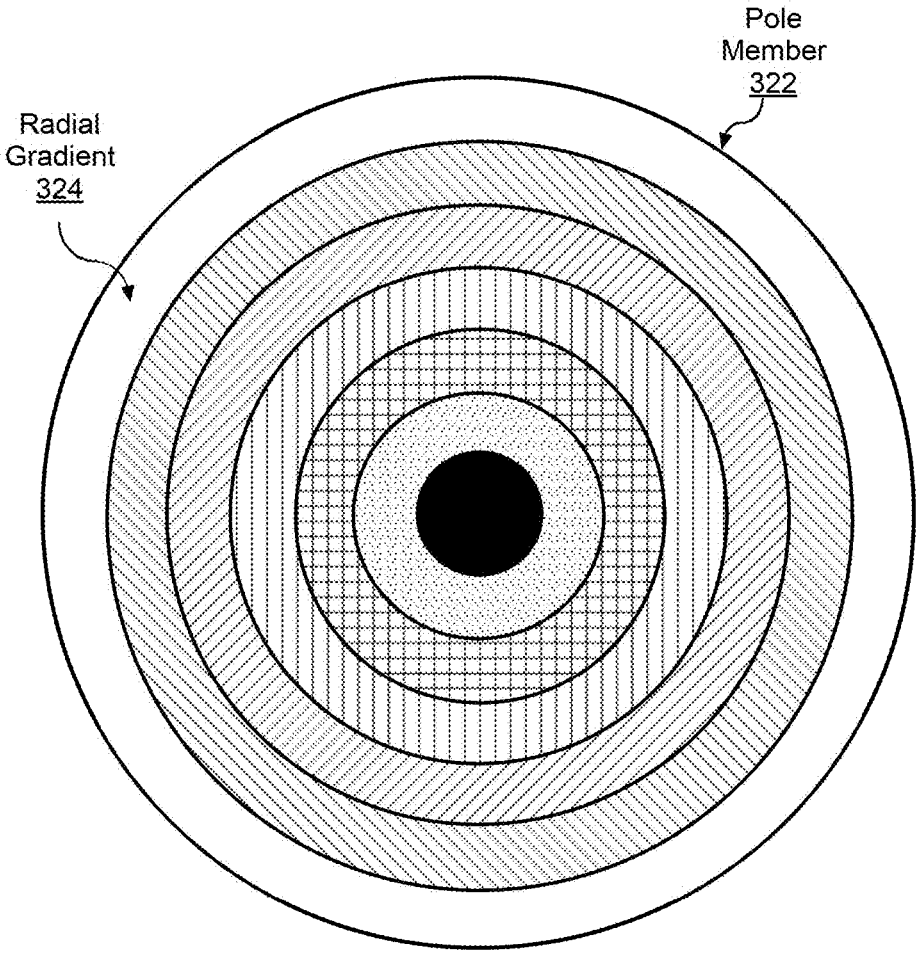

FIG. 3C shows yet another pole member 322 according to various embodiments. Pole member 322 may be included in the upper pole assembly 230 and/or lower pole assembly 250 of FIG. 2A. Pole member 312 may be similar to pole member 302 of FIG. 3A and/or pole member 312 of FIG. 3B.

However, rather than having voids (e.g., pole member 302) or recesses (e.g., pole member 312), pole member 322 has a radial gradient 324, as indicated by the different styles of hashes, as a function of the radial component (e.g., a polar coordinate system imposed on the upper surface of pole member 322). In some embodiments, the radial gradient 324 may be a radial gradient in the thickness of the pole member 322. In other embodiments, the radial gradient 324 may be a radial gradient in the magnetic permeability of the pole member 322. For instance, pole member 322 may be a composite pole member comprised of a plurality of materials with a plurality of magnetic permeabilities. In some embodiments, the radial gradient 324 is a gradient in both thickness and magnetic permeability. The gradient profile for the thickness gradient need not be the same gradient profile of the permeability gradient. Although FIG. 3C shows discreet jumps in the radial gradient 324, the gradient may be at least somewhat continuous in other embodiments.

Figure 3D:
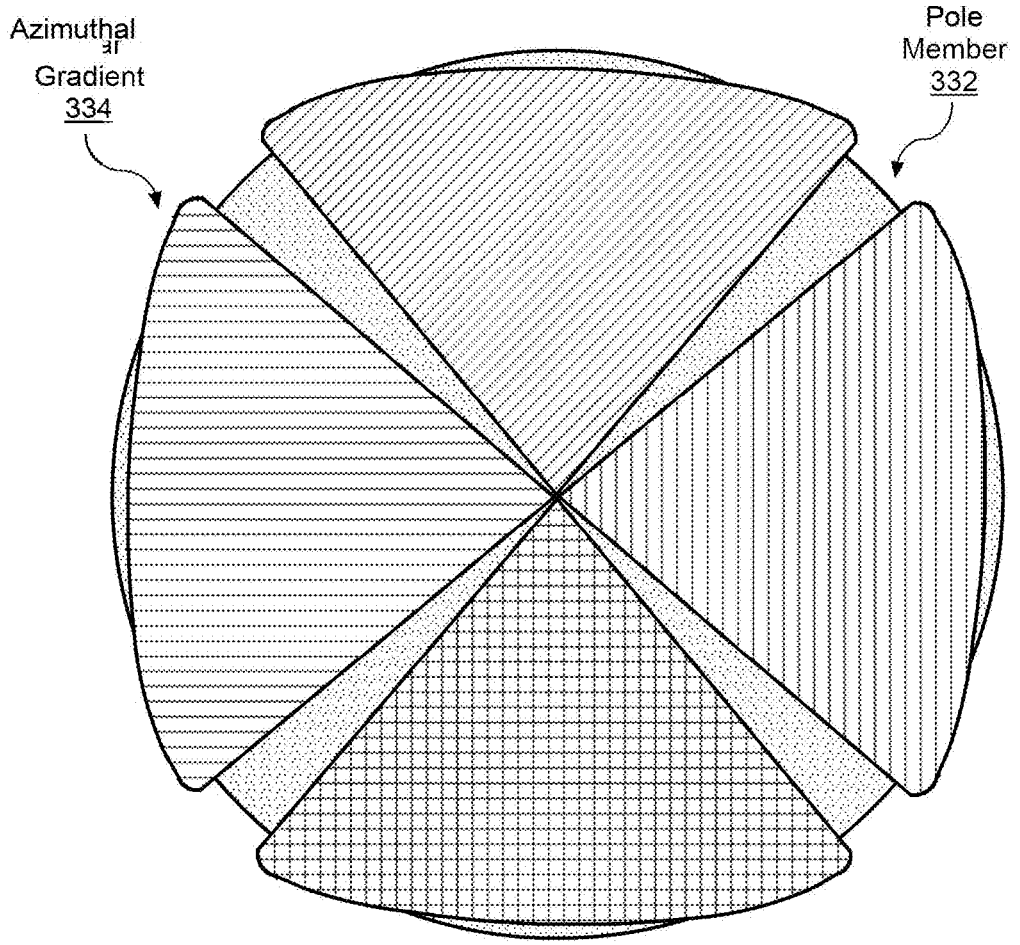
Figure 3E:
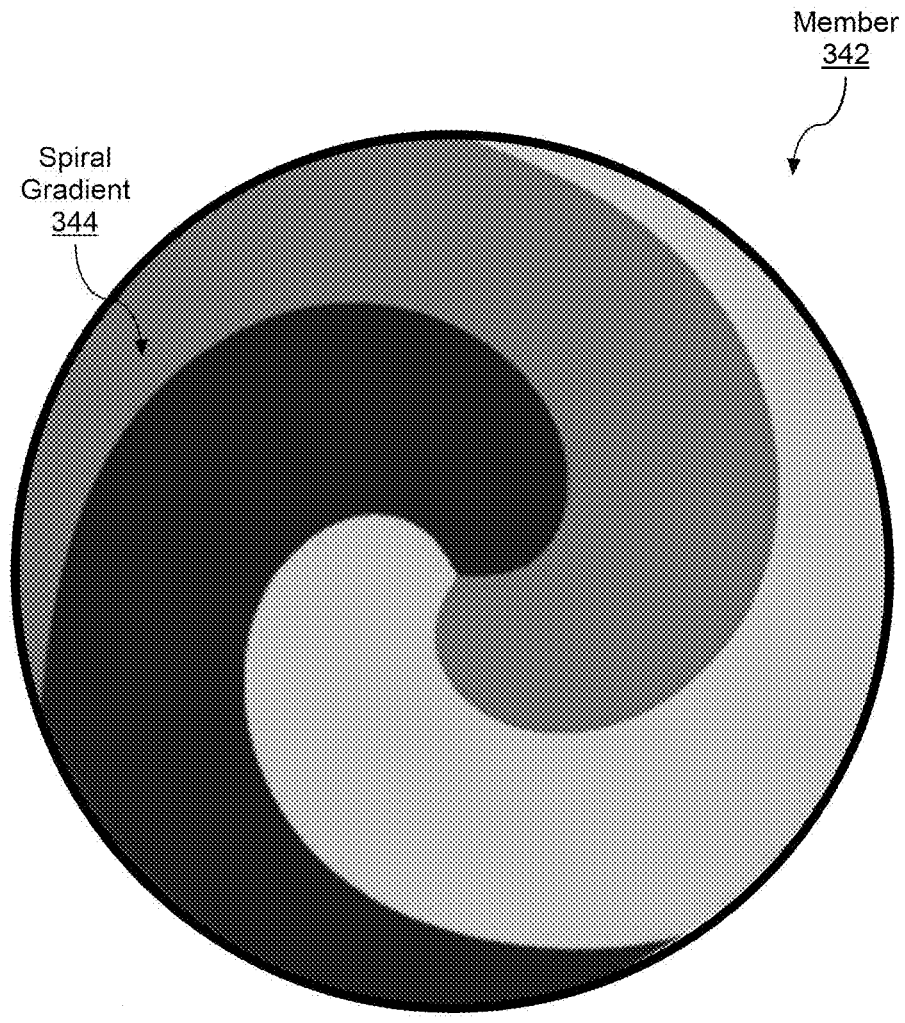
Figure 3F:
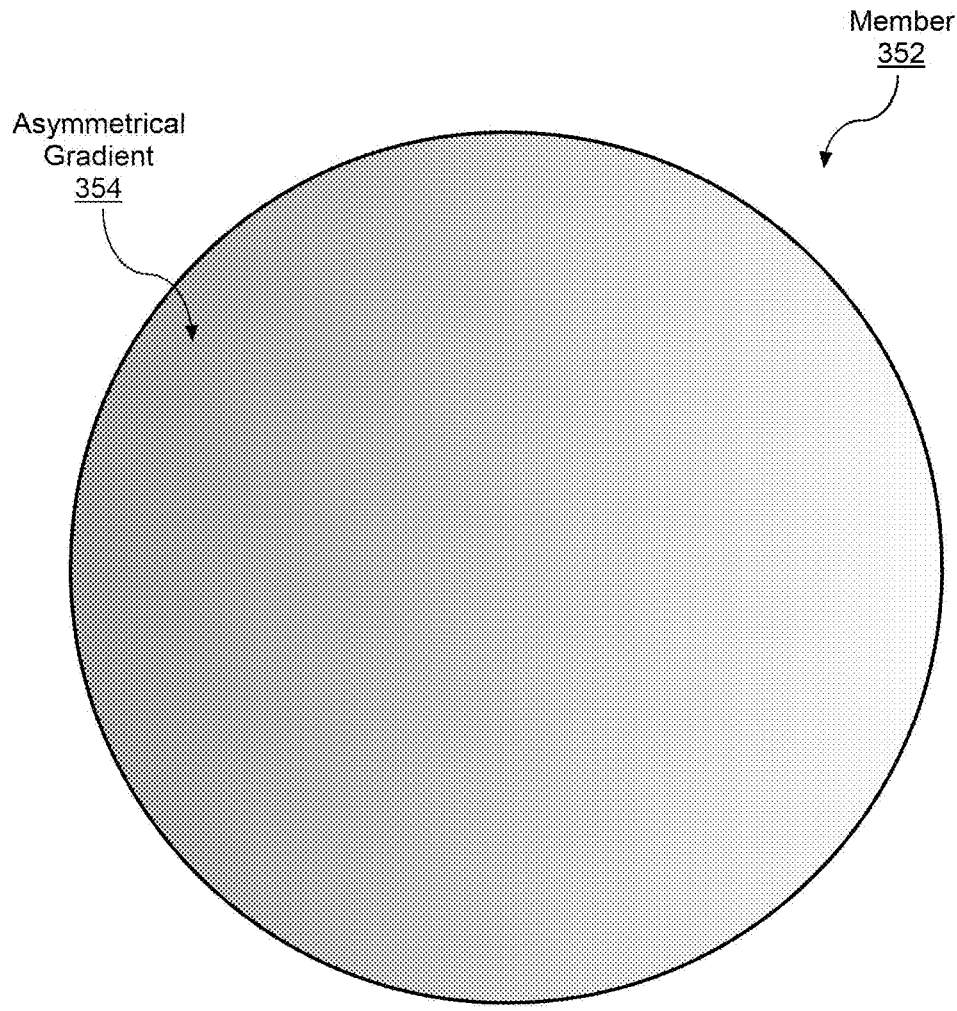

FIG. 3D shows still another pole member 332 according to various embodiments. Pole member 332 may be similar to pole member 322 of FIG. 3C. However, rather than a radial profile, pole member 332 may have an azimuthal gradient 334 in at least one of the thickness or magnetic permeability of the pole member 332. In some embodiments, the gradient of a pole member may be dependent on both the radial component and azimuthal component of the polar coordinate system. FIG. 3E shows another pole member 342 with a spiral gradient 344 in at least one of the thickness and/or the magnetic permeability of the pole member 342. FIG. 3F shows yet another pole member 352 with an asymmetric gradient 354 in at least one of the thickness and/or the magnetic permeability of the pole member 342.

Figure 4A:
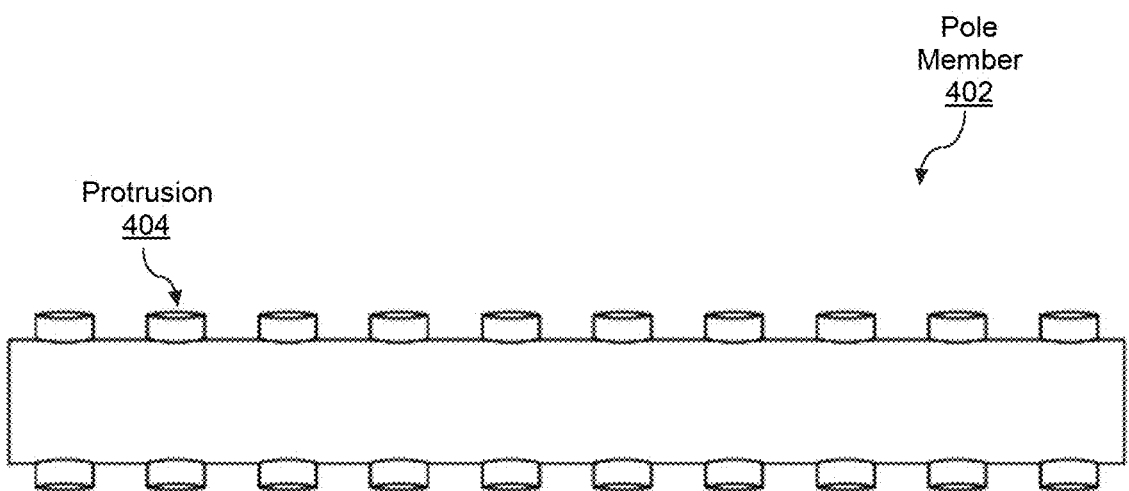
FIGS. 4A-4C depict example embodiments of pole assemblies and pole members with example, but non-limiting, discontinuous and continuous spatial variances in their thicknesses and magnetic permeabilities.

In contrast to the top-views of various embodiments of pole members in FIGS. 3A-3F, FIGS. 4A-4C show various additional embodiments of pole members from a side-view that is rotated 90° from the top-down views. FIG. 4A shows another pole member 402 according to various embodiments. Pole member 402 includes a plurality of protrusions on its upper and lower surfaces (e.g., protrusion 404). In other embodiments, the protrusions may be included in only one of the upper or lower surfaces of pole member 402. Although the protrusions are shown as regular shapes in FIG. 4A, the protrusions may be of irregular shape and need not be uniform in shape. In some embodiments, the side-walls of the protrusions may be sloped inward or outward. In various embodiments, the protrusions may be made of an equivalent (or similar) material than the body of the cylindrical disk of the pole member 402, such that the magnetic permeability of the body of the cylindrical disk and the protrusions are equivalent (or at least similar). In other embodiments, the materials of the protrusions and the cylindrical disk may be dissimilar, such that the magnetic permeability of the protrusions and the cylindrical disk are dissimilar. In still other embodiments, the material (and thus the magnetic permeability may be varied across the protrusions. For instance, a first protrusion (e.g., protrusion 404) may be made of a different material from a second protrusion.

Figure 4B:
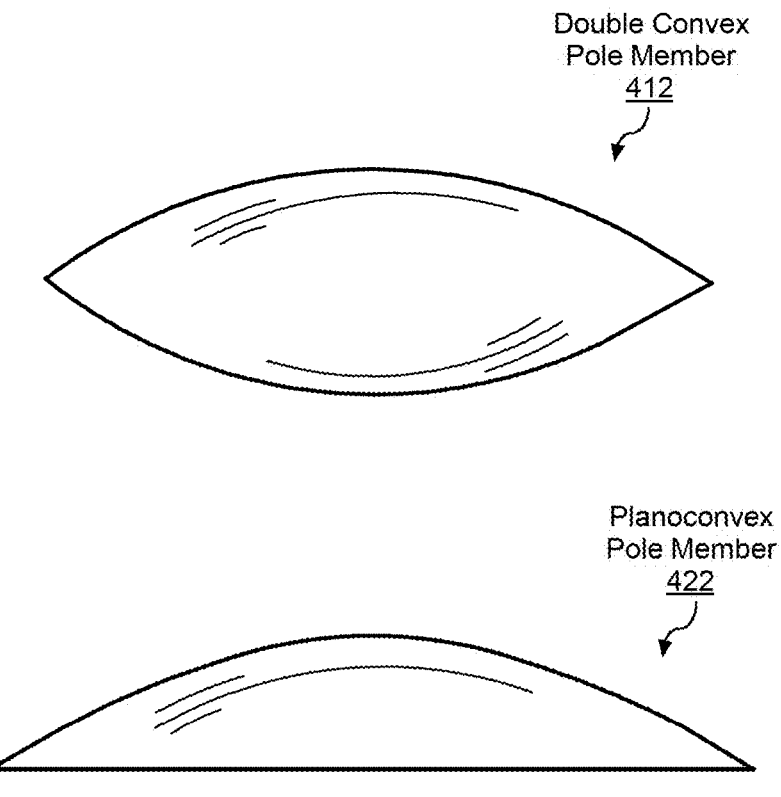
Figure 4B:
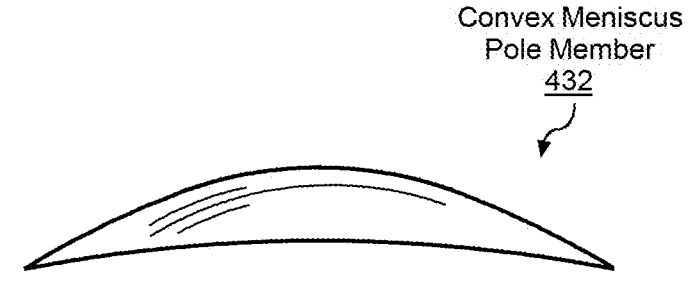
Figure 4C:
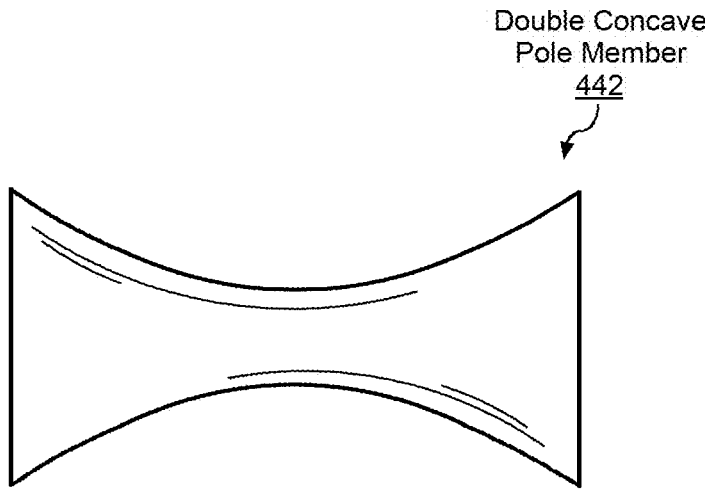
Figure 4C:
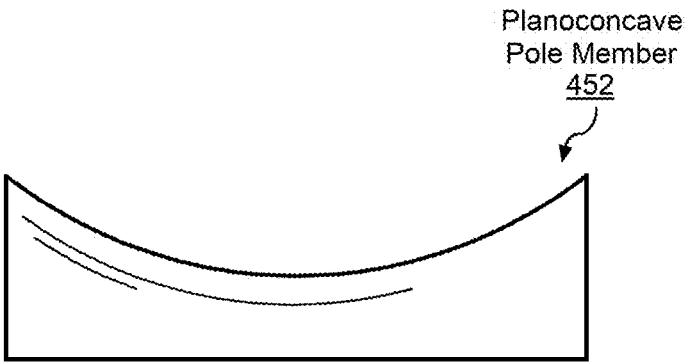
Figure 4C:
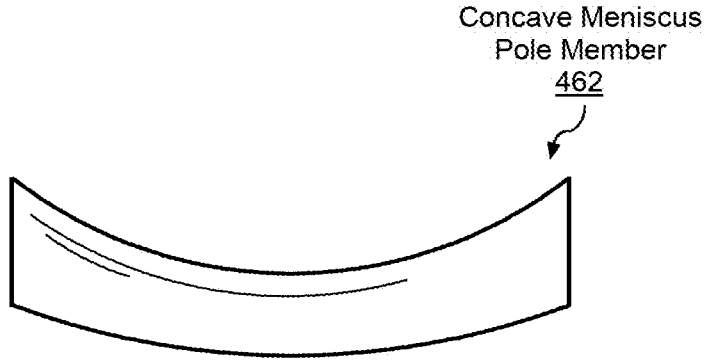

FIGS. 4B-4C illustrate side-views of various continuous thickness gradients for a pole member, according to the embodiments. The thickness gradients shown in FIGS. 4B-4C are not intended to be limiting, and pole members may be constructed via other thickness gradients. More particularly, FIG. 4B shows side-views of various convex pole members according to embodiments. FIG. 4B illustrates a double convex pole member 412, a planoconvex pole member 422, and a convex meniscus pole member 432. FIG. 4C shows side-views of various concave pole members according to embodiments. FIG. 4C illustrates a double concave pole member 442, a planoconcave pole member 452, and a concave meniscus pole member 462.

Figure 5A:
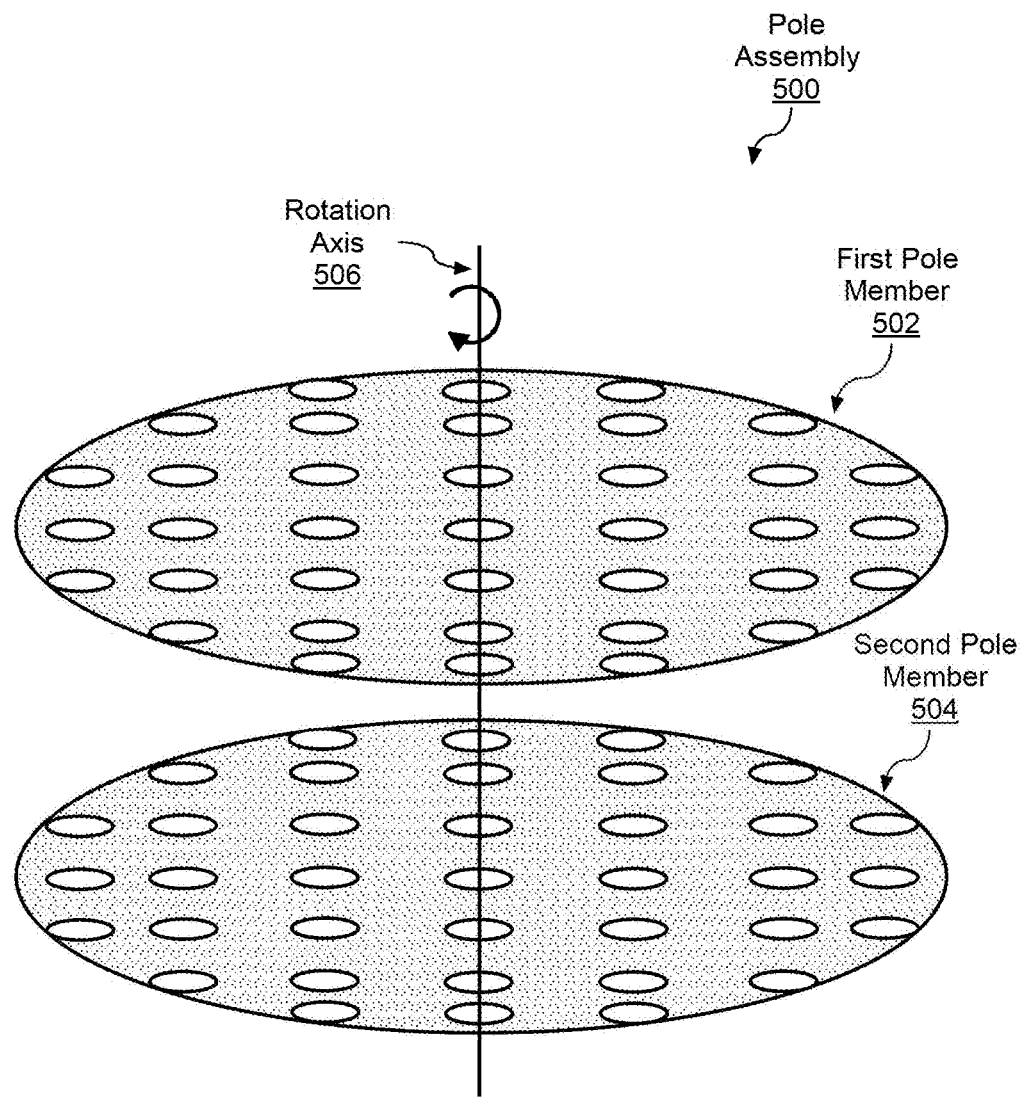
FIGS. 5A-5B depict example embodiments of pole assemblies and pole members with example, but non-limiting, discontinuous and continuous spatial variances in their thicknesses and magnetic permeabilities.

FIG. 5A shows a pole assembly 500 that includes multiple pole members, according to various embodiments. FIG. 5A shows an off-angle exploded view of the pole assembly 500. More particularly, pole assembly 500 includes a first pole member 502 and a second pole member 504. Although the first pole member 502 and the second pole member 504 are shown in FIG. 5A to be similar to pole member 302 of FIG. 3A, the embodiments are not so limited and each of the first pole member 502 and the second pole member 504 may be any of the pole members contemplated herein. First pole member 502 may include a first spatial variance in at least one of its shape or its magnetic permeability. Second pole member 504 may include a second spatial variance in at least one of its shape or its magnetic permeability. In some embodiments, the first spatial variance of the first pole member 502 may be equivalent (or at least similar) to the second spatial variance of the second pole member 504. In other embodiments, the first spatial variance of the first pole member 502 may be dissimilar to the second spatial variance of the second pole member 504.

As shown in the exploded view of FIG. 5A, in pole assembly 500, the first pole member 502 and the second pole member 504 may be vertically stacked. At least one of the first pole member 502 or the second pole member 504 may be configured to rotated about the vertical rotation axis 506. By varying the relative angle, about the rotation axis 506, between the first pole member 502 and the second pole member 504, the spatial variance of the magnetic reluctance of the pole assembly 500 may be varied. Thus, the spatial variance in the magnetic reluctance of the pole assembly 500 may be "tuned" by "tuning" (e.g., rotating) the relative angle between the first pole member 502 and the second pole member 504. Accordingly, the pole assembly 500 may be tuned to a specific non-uniformity of the magnetic circuit within a circulator. A circulator that includes the pole assembly 500 may be calibrated for precision signal routing and isolation after its fabrication by enabling the relative rotation of the first pole member 502 and the second pole member 504. In some embodiments, the calibrating or tuning of a precision circulator may be performed in situ within a cryogenic chamber. The inclusion of two pole members within a single pole assembly is non-limiting, and various pole assemblies may include three or more pole members. Such pole assemblies may enable a relative rotation between each pair of pole members included in the pole assembly. Pole assemblies, such as but not limited to pole assembly 500, that include two or more pole members may be referred to as composite pole assemblies.

Figure 5B:
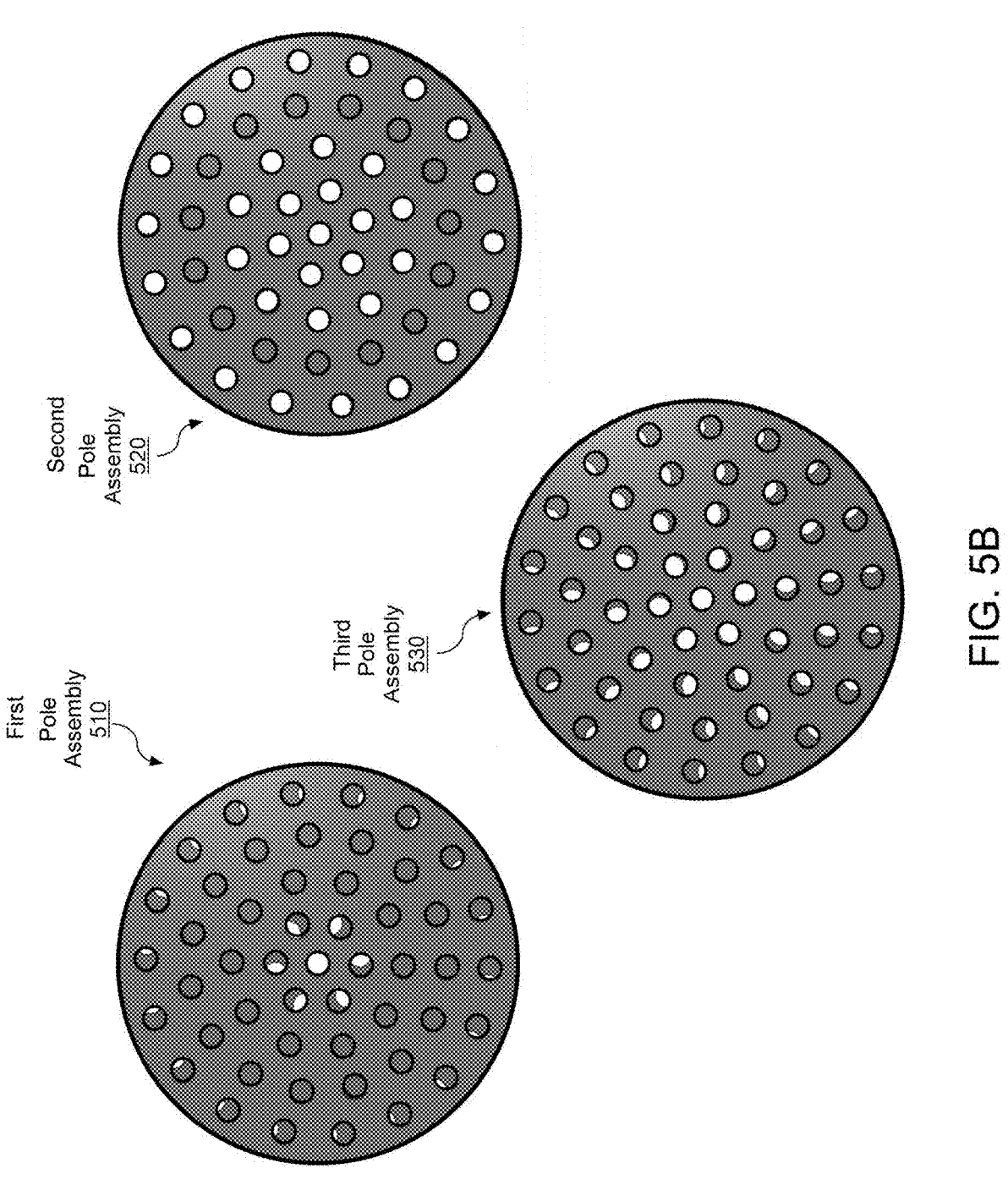

FIG. 5B shows various pole assemblies that provide a tunable spatial variance in the magnetic reluctance of the pole assembly, according to various embodiments. More particularly, FIG. 5B shows a first pole assembly 510, a second pole assembly 520, and a third pole assembly 530. Each of the first pole assembly 510, the second pole assembly 520, and the third pole assembly 530 is a composite pole assembly. That is, each of the first pole assembly 510, the second pole assembly 520, and the third pole assembly 530 includes at least a first pole member and a second pole member. Each of the first and second pole members of the pole assemblies may be similar to pole member 302 of FIG. 3A, in that each of the pole members may include a plurality of voids (e.g., perforations and/or bore holes). Though the embodiments are not so limited, and as discussed in conjunction with FIG. 5A, a composite pole assembly may be constructed via any combination of any of the pole members contemplated herein.

The pole assemblies of FIG. 5B are shown in a top-down view, similar to views of pole members provided by FIG. 3A-3F. Thus, in in the top-down views of FIG. 5B, the second pole member in each of the pole assemblies is below (and thus mostly obscured) in FIG. 5B. However, as shown in FIG. 5A, the spatial variance of the magnetic reluctance of the composite pole assemblies may be tuned by a relative rotation between the two pole members. Although not shown explicitly in FIG. 5B, a spatial variance of the magnetic permeability of a composite pole assembly may be tuned via similar relative rotations of pole members.

Figure 6A:
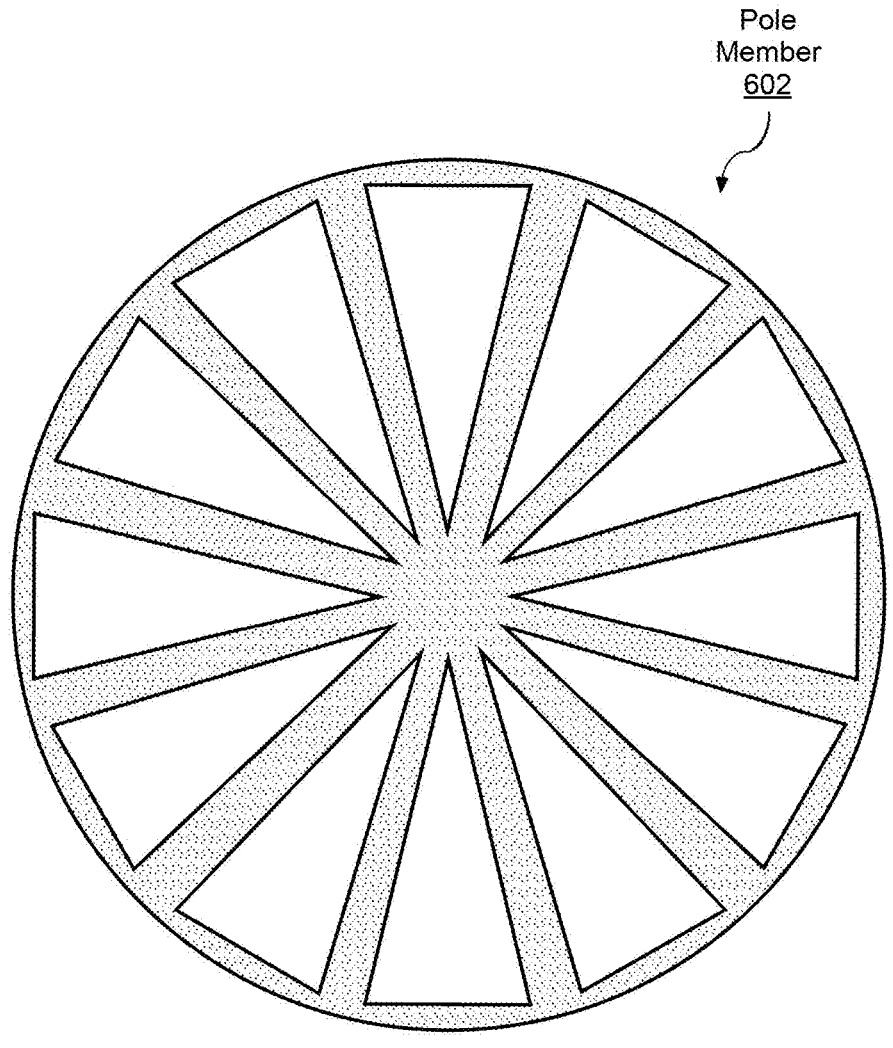
FIGS. 6A-6B depict example embodiments of pole assemblies and pole members with example, but non-limiting, discontinuous and continuous spatial variances in their thicknesses and magnetic permeabilities.
Figure 6B:
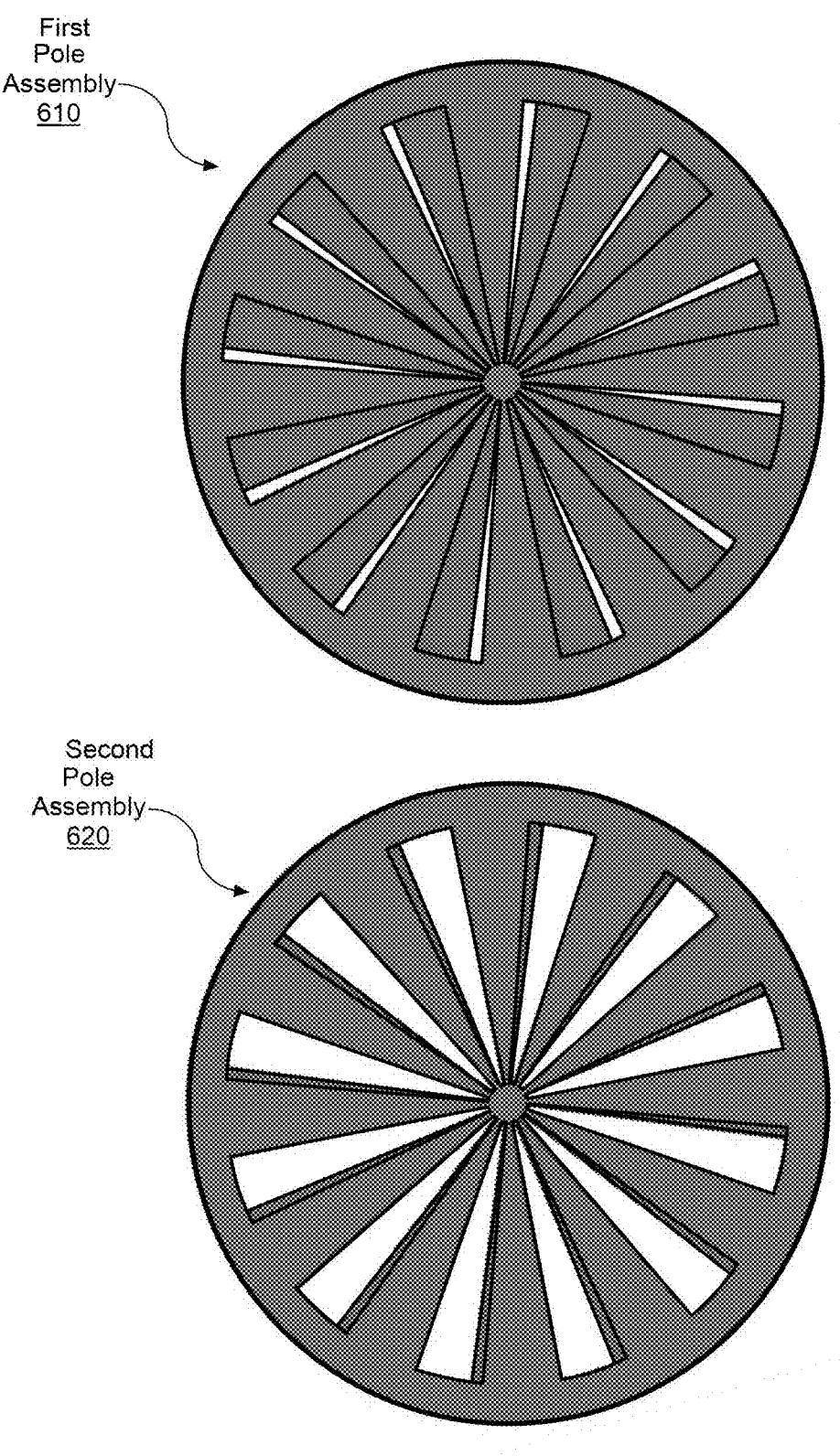

FIG. 6A shows a top-down view of another pole member 602 with a plurality of voids. Thus, pole member 602 may be similar to pole member 302 of FIG. 3A. However, the voids in FIG. 6A may be radial fins (e.g., radial cutouts), as opposed to bore holes. FIG. 6B shows composite pole assemblies according to various embodiments. More particularly, FIG. 6B shows a first pole assembly 610 and a second pole assembly 620. Each of first pole assembly 610 and second pole assembly 620 may be composite pole assemblies comprised of a first and second pole member 25 similar to pole member 602 of FIG. 6B. As shown in in FIG. 6B, the spatial variance of the thickness of the combination of the pole members may be tuned buy a relative rotation between the pole members.

ADDITIONAL EMBODIMENTS

Some embodiments include a waveguide assembly within a non-reciprocal electronic device. The waveguide assembly may include a ferrite member, a magnetic member, and a pole assembly, e.g., see FIG. 2A. The pole assembly, in combination with at least the ferrite member and the magnetic member forms a magnetic circuit. The pole assembly has a spatial variance of a magnetic reluctance. The spatial variance of the magnetic reluctance of the pole assembly provides an increase in a uniformity of a magnetic flux throughout a volume of the ferrite member. A non-reciprocal property of the electronic device is enhanced due to the increase in the uniformity of the magnetic flux.

The electronic device may include the waveguide assembly, a first port, a second port, and a third port, e.g., see FIG. 2A. The non-reciprocal property of the electronic device may include: in response to a first signal being provided as an input signal to the first port, the second port provides the first signal as an output signal. The non-reciprocal property of the electronic device may further include: in response to the first signal being provided as the input signal to the second port, the third port provides the first signal as the output signal. The non-reciprocal property of the electronic device may also include: in response to the first signal being provided as the input signal to the third port, the first port provides the first signal as the output signal.

In some embodiments, the pole assembly comprises a first pole member. The first pole member may have a spatial variance (e.g., a discontinuous or continuous gradient) that provides the spatial variance of the magnetic reluctance of the pole assembly. The spatial variance of the first pole member may include a spatial variance in at least one of a shape (e.g., a thickness) or a magnetic permeability of the first pole member.

In some non-limiting embodiments, the spatial variance in the shape of the first pole member includes a plurality of voids positioned in a volume of the first pole member (e.g., see FIG. 3A). The plurality of voids positioned in the volume of the first pole member may include a plurality of perforations throughout a surface of the first pole member. In other embodiments, the plurality of voids positioned in the volume of the first pole member includes a plurality of recesses positioned on a surface of the first pole member, e.g., see FIG. 3B. In various embodiments, the spatial variance in the shape of the first pole member includes a plurality of etchings positioned on a surface of the first pole member. The plurality of etchings positioned on the surface of the first pole member may be generated via an electrochemical etching process.

In still other embodiments, the spatial variance in the shape of the first pole includes a plurality of protrusions positioned on the surface of the first pole member, e.g., see FIG. 4A. The spatial variance in the shape of the first pole member includes a gradient in a thickness of the first pole member. The gradient in the thickness of the first pole member includes a gradient along a radial direction of the first pole member. The gradient in the thickness of the first pole member may include a gradient along a radial direction of the first pole member, e.g., see FIG. 3C. The gradient in the thickness of the first pole member may additionally and/or alternatively include a gradient of thickness along an azimuthal direction of the first pole member, e.g., see FIG. 3D. In some embodiments, the first pole member is a composite pole member comprised of a plurality of materials of separate magnetic permeability. The variance in the magnetic permeability of the first pole member is provided by a positioning of each material of the plurality of materials within a volume of the first pole member.

In some embodiments, the first pole member is first cylindrical disk. The spatial variance of the first pole member is a first spatial variance. The pole assembly further comprises a second pole member that is a second cylindrical disk that is positioned on top of the first pole member, e.g., see FIG. 5A. The first pole member and the second pole member have a common vertical axis of rotation and the second pole member has a second spatial variance. The first pole member may be rotated about the common vertical axis of rotation through a first angle relative to the second pole member. The combination of the first spatial variance of the first pole member and the second spatial variance of the second pole member provides the increase in the uniformity of the magnetic flux throughout the volume of the ferrite member, e.g., see FIGS. 5B and 6B. The first pole member may be rotated in situ of a cryogenic chamber that houses the electronic device.

Other embodiments include a quantum computing system. The quantum computing system may include a plurality of qubits, a quantum logic circuit (QLC), and a circulator device. The QLC is enabled to perform a set of quantum operations on the plurality of qubits. The circulator device is enabled to non-reciprocally route signals associated with the set of quantum operations. The circulator device may include a ferrite member, a magnetic member, and a pole assembly. The pole assembly, in combination with at least the ferrite member and the magnetic member forms a magnetic circuit. The pole assembly has a spatial variance of a magnetic reluctance. The spatial variance of the magnetic reluctance of the pole assembly provides an increase in a uniformity of a magnetic flux throughout a volume of the ferrite member. A non-reciprocal property of the circulator device is enhanced due to the increase in the uniformity of the magnetic flux. The quantum computing system may further include a cryogenic chamber. The plurality of qubits, the QLC, and the circulator device may be positioned within the cryogenic chamber.

Still other embodiments are directed to a cryogenic system. The cryogenics system may include a cryogenic chamber and a circulatory device positioned within the cryogenic chamber. The circulator device may include a ferrite member, a magnetic member, and a pole assembly. The pole assembly, in combination with at least the ferrite member and the magnetic member forms a magnetic circuit. The pole assembly has a spatial variance of a magnetic reluctance. The spatial variance of the magnetic reluctance of the pole assembly provides an increase in a uniformity of a magnetic flux throughout a volume of the ferrite member. A non-reciprocal property of the circulator device is enhanced due to the increase in the uniformity of the magnetic flux. The quantum computing system may further include a cryogenic chamber. The plurality of qubits, the QLC, and the circulator device may be positioned within the cryogenic chamber.

Implementations of the digital, classical, and/or quantum subject matter and the digital functional operations and quantum operations described in this specification can be implemented in digital electronic circuitry, suitable quantum circuitry or, more generally, quantum computational systems, in tangibly-implemented digital and/or quantum computer software or firmware, in digital and/or quantum computer hardware, including the structures disclosed in this specification and their structural equivalents, or in combinations of one or more of them. The term "quantum computing systems" may include, but is not limited to, quantum computers/computing systems, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits/qubit structures, or a combination of one or more of them. Alternatively or in addition, the program instructions can be encoded on an artificially-generated propagated signal that is capable of encoding digital and/or quantum information (e.g., a machine-generated electrical, optical, or electromagnetic signal) that is generated to encode digital and/or quantum information for transmission to suitable receiver apparatus for execution by a data processing apparatus.

The terms quantum information and quantum data refer to information or data that is carried by, held, or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states (e.g., qudits) are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, or multiple digital and quantum processors or computers, and combinations thereof. The apparatus can also be, or further include, special purpose logic circuitry, e.g., an FPGA (field programmable gate array), or an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital or classical computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL, Quipper, Cirq, etc.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers or processors to be "configured to" or "operable to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum microprocessors or both, or any other kind of central digital and/or quantum processing unit. Generally, a central digital and/or quantum processing unit will receive instructions and digital and/or quantum data from a read-only memory, or a random access memory, or quantum systems suitable for transmitting quantum data, e.g. photons, or combinations thereof.

Some example elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, or optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more tangible, non-transitory machine-readable storage media, and that are executable on one or more digital and/or quantum processing devices. The systems described in this specification, or portions of them, can each be implemented as an apparatus, method, or electronic system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A cryogenic system comprising:
a cryogenic chamber; and
a circulator device positioned within the cryogenic chamber, the circulator device comprising:
    a ferrite member;
    a magnetic member; and
    a pole assembly that in combination with at least the ferrite member and the magnetic member forms a magnetic circuit, wherein the pole assembly comprises a first pole member that has a spatial variance of a magnetic reluctance that provides an increase in a uniformity of a magnetic flux throughout a volume of the ferrite member to provide non-reciprocal behavior of the circulator device due to the increase in the uniformity of the magnetic flux, and wherein the first pole member being disposed between the ferrite member and the magnetic member.

2. A waveguide assembly within a non-reciprocal electronic device, the waveguide assembly comprising:
a ferrite member;
a magnetic member; and
a pole assembly that in combination with at least the ferrite member and the magnetic member forms a magnetic circuit, wherein the pole assembly comprises a first pole member that has a spatial variance of a magnetic reluctance that provides an increase in a uniformity of a magnetic flux throughout a volume of the ferrite member to provide non-reciprocal behavior of the electronic device due to the increase in the uniformity of the magnetic flux, and wherein the first pole member being disposed between the ferrite member and the magnetic member.

3. The waveguide assembly of claim 2, wherein the electronic device comprises:

the waveguide assembly;

a first port;

a second port; and a third port, wherein the non-reciprocal behavior of the electronic device comprises:

in response to a first signal being provided as an input signal to the first port, the second port provides the first signal as an output signal;

in response to the first signal being provided as the input signal to the second port, the third port provides the first signal as the output signal; and in response to the first signal being provided as the input signal to the third port, the first port provides the first signal as the output signal.

4. The waveguide of claim 2, wherein the spatial variance of the first pole member includes a spatial variance in at least one of a shape or a magnetic permeability of the first pole member.

5. The waveguide assembly of claim 4, wherein the spatial variance in the shape of the first pole member includes a plurality of voids positioned in a volume of the first pole member.

6. The waveguide assembly of claim 5, wherein the plurality of voids positioned in the volume of the first pole member includes a plurality of perforations throughout a surface of the first pole member.

7. The waveguide assembly of claim 5, wherein the plurality of voids positioned in the volume of the first pole member includes a plurality of recesses positioned on a surface of the first pole member.

8. The waveguide assembly of claim 4, wherein the spatial variance in the shape of the first pole member includes a plurality of etchings positioned on a surface of the first pole member.

9. The waveguide assembly of claim 8, wherein the plurality of etchings positioned on the surface of the first pole member was generated via an electrochemical etching process.

10. The waveguide assembly of claim 4, wherein the spatial variance in the shape of the first pole member includes a plurality of protrusions positioned on a surface of the first pole member.

11. The waveguide assembly of claim 4, wherein the spatial variance in the shape of the first pole member includes a gradient in a thickness of the first pole member.

12. The waveguide assembly of claim 11, wherein the gradient in the thickness of the first pole member includes a gradient along a radial direction of the first pole member.

13. The waveguide assembly of claim 11, wherein the gradient in the thickness of the first pole member includes a gradient of thickness along an azimuthal direction of the first pole member.

14. The waveguide assembly of claim 4, wherein the first pole member is a composite pole member comprised of a plurality of materials of separate magnetic permeability such that the variance in the magnetic permeability of the first pole member is provided by a positioning of each material of the plurality of materials within a volume of the first pole member.

15. The waveguide assembly of claim 4, wherein the first pole member is first cylindrical disk, the spatial variance of the first pole member is a first spatial variance, and the pole assembly further comprises:

a second pole member that is a second cylindrical disk that is positioned on top of the first pole member such that the first pole member and the second pole member have a common vertical axis of rotation and the second pole member has a second spatial variance.

16. The waveguide assembly of claim 15, wherein the first pole member is rotated about the common vertical axis of rotation through a first angle relative to the second pole member such that the combination of the first spatial variance of the first pole member and the second spatial variance of the second pole member provides the increase in the uniformity of the magnetic flux throughout the volume of the ferrite member.

17. The waveguide assembly of claim 16, wherein the first pole member is rotated in situ of a cryogenic chamber that houses the electronic device.

18. A quantum computing system, comprising:

a plurality of qubits;

a quantum logic circuit (QLC) that is enabled to perform a set of quantum operations on the plurality of qubits; and a circulator device that is enabled to non-reciprocally route signals associated with the set of quantum operations, wherein the circulator device comprises:

a ferrite member;

a magnetic member; and a pole assembly that in combination with at least the ferrite member and the magnetic member forms a magnetic circuit, wherein the pole assembly comprises a first pole member that has a spatial variance of a magnetic reluctance that provides an increase in a uniformity of a magnetic flux throughout a volume of the ferrite member to provide non-reciprocal behavior of the circulator device due to the increase in the uniformity of the magnetic, and wherein the first pole member being disposed between the ferrite member and the magnetic member.

19. The quantum computing system of claim 18, further comprising a cryogenic chamber, wherein the plurality of qubits, the QLC, and the circulator device are positioned within the cryogenic chamber.

\* \* \* \* \*